US012203303B2

(12) United States Patent
Prior

(10) Patent No.: US 12,203,303 B2
(45) Date of Patent: Jan. 21, 2025

(54) VEHICLE CLOSURE MEMBER HINGE ASSEMBLIES WITH INTERNAL STOP FEATURES

(71) Applicant: FORD GLOBAL TECHNOLOGIES, LLC, Dearborn, MI (US)

(72) Inventor: Joseph Prior, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 18/330,391

(22) Filed: Jun. 7, 2023

(65) Prior Publication Data

US 2024/0410212 A1 Dec. 12, 2024

(51) Int. Cl.
*E05D 11/06* (2006.01)
*E05D 3/02* (2006.01)

(52) U.S. Cl.
CPC ................ *E05D 11/06* (2013.01); *E05D 3/02* (2013.01)

(58) Field of Classification Search
CPC ................................. E05D 11/06; E05D 3/02
See application file for complete search history.

(56) References Cited

U.S. PATENT DOCUMENTS

| | | | | |
|---|---|---|---|---|
| 3,567,274 | A | | 3/1971 | Kaptur, Jr. et al. |
| 4,949,427 | A | | 8/1990 | Keller |
| 5,165,830 | A | | 11/1992 | Vecellio |
| 5,561,887 | A | * | 10/1996 | Neag ....................... E05D 3/127 16/334 |
| 5,664,717 | A | | 9/1997 | Joder |
| 5,879,102 | A | | 3/1999 | Koliopoulos |
| 6,899,374 | B1 | | 5/2005 | Heard |
| 8,430,440 | B1 | | 4/2013 | Simon et al. |
| 10,626,646 | B1 | | 4/2020 | Amador et al. |
| 10,738,520 | B2 | * | 8/2020 | Cherry .................... E05D 11/06 |
| 11,104,276 | B2 | * | 8/2021 | Thomas .................... B60R 7/04 |
| 2006/0026795 | A1 | * | 2/2006 | Tonelli .................... E05D 7/105 16/221 |
| 2006/0279108 | A1 | | 12/2006 | Brockhoff et al. |
| 2009/0056074 | A1 | | 3/2009 | Chase |
| 2009/0106940 | A1 | | 4/2009 | Greenbank |
| 2013/0214561 | A1 | | 8/2013 | Chaufour et al. |
| 2014/0130707 | A1 | | 5/2014 | Batchelor |
| 2018/0371813 | A1 | | 12/2018 | Cherry et al. |
| 2022/0332528 | A1 | | 10/2022 | Shahbazian |

* cited by examiner

*Primary Examiner* — Janet M Wilkens
*Assistant Examiner* — Susan M. Heschel
(74) *Attorney, Agent, or Firm* — Vichit Chea; Carlson, Gaskey & Olds, P.C.

(57) ABSTRACT

Closure member systems are provided for motor vehicles. Exemplary closure member systems may include a hinge assembly having an internal stop. The internal stop may be established by portions of both a stationary hinge component and a movable hinge component of the hinge assembly. For example, the stationary hinge component may include one or more ears that are arranged to contact one or more stop surfaces provided on the movable hinge component. The ears may engage the stop surfaces to limit a range of motion of the closure member.

20 Claims, 5 Drawing Sheets

VEHICLE CLOSURE MEMBER HINGE ASSEMBLIES WITH INTERNAL STOP FEATURES

TECHNICAL FIELD

This disclosure relates to motor vehicles, and more particularly to vehicle closure member systems that include hinge assemblies with internal stop features.

BACKGROUND

Motor vehicles typically include one or more closure members. Exemplary closure members are doors and swing gates. Generally, closure members can be moved between open and closed positions relative to a body structure of the vehicle in order to provide vehicle ingress/egress.

SUMMARY

A vehicle closure member system according to an exemplary aspect of the present disclosure includes, among other things, a closure member, a first hinge assembly mounted to the closure member, and an internal stop concealed inside the first hinge assembly and configured to limit a range of motion of the closure member between a closed position and a fully open position.

In a further non-limiting embodiment of the foregoing vehicle closure member system, the closure member is a rear swing gate.

In a further non-limiting embodiment of either of the foregoing vehicle closure member systems, the first hinge assembly includes a stationary hinge component, a movable hinge component, and a pivot pin that pivotably connects the movable hinge component to the stationary hinge component.

In a further non-limiting embodiment of any of the foregoing vehicle closure member systems, the stationary hinge component includes a base portion and a bracket portion, and the movable hinge component includes a base portion and a bracket portion.

In a further non-limiting embodiment of any of the foregoing vehicle closure member systems, the base portion of the stationary hinge component includes a barrel mount and a beam that protrudes radially outwardly from an outer circumferential surface of the barrel mount.

In a further non-limiting embodiment of any of the foregoing vehicle closure member systems, the base portion of the movable hinge component includes a first arm and a second arm that flank the barrel mount of the stationary hinge component.

In a further non-limiting embodiment of any of the foregoing vehicle closure member systems, the beam includes a first ear and a second ear, the first arm includes a first stop surface and a second stop surface, and the second arm includes a third stop surface and a fourth stop surface.

In a further non-limiting embodiment of any of the foregoing vehicle closure member systems, the first ear engages the first stop surface and the second ear engages the third stop surface when the closure member is moved to the closed position.

In a further non-limiting embodiment of any of the foregoing vehicle closure member systems, the first ear engages the second stop surface and the second ear engages the fourth stop surface when the closure member is moved to the fully open position.

In a further non-limiting embodiment of any of the foregoing vehicle closure member systems, the first stop surface and the second stop surface are provided within a first cavity formed in the first arm, and the third stop surface and the fourth stop surface are provided within a second cavity formed in the second arm.

In a further non-limiting embodiment of any of the foregoing vehicle closure member systems, the internal stop is established by a first feature of the stationary hinge component and a second feature of the movable hinge component.

In a further non-limiting embodiment of any of the foregoing vehicle closure member systems, the first feature includes an ear and the second feature includes a stop surface.

In a further non-limiting embodiment of any of the foregoing vehicle closure member systems, a second hinge assembly is mounted to the closure member. A second internal stop is concealed inside the second hinge assembly and is configured to limit the range of motion of the closure member between the closed position and the fully open position.

A vehicle according to another exemplary aspect of the present disclosure includes, among other things, a vehicle body, a closure member, and a first hinge assembly configured to movably support the closure member relative to the vehicle body. The first hinge assembly includes an internal stop established by a first feature of a stationary hinge component of the first hinge assembly and a second feature of a movable hinge component of the first hinge assembly.

In a further non-limiting embodiment of the foregoing vehicle, the closure member is a rear swing gate.

In a further non-limiting embodiment of either of the foregoing vehicles, the internal stop is concealed within the first hinge assembly.

In a further non-limiting embodiment of any of the foregoing vehicles, the internal stop is not visible from an exterior of the first hinge assembly.

In a further non-limiting embodiment of any of the foregoing vehicles, the stationary hinge component is mounted to the vehicle body, and the movable hinge component is mounted to the closure member.

In a further non-limiting embodiment of any of the foregoing vehicles, the first feature includes an ear and the second feature includes a stop surface.

In a further non-limiting embodiment of any of the foregoing vehicles, the ear extends from a beam that protrudes radially outwardly from an outer circumferential surface of a barrel mount of the stationary hinge component, and the stop surface is provided within a cavity formed in an arm of the movable hinge component.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary closure member systems for motor vehicles. Exemplary closure member systems may include a hinge assembly having an internal stop. The internal stop may be established by portions of both a stationary hinge component and a movable hinge component of the hinge assembly. For example, the stationary hinge component may include one or more ears that are arranged to contact one or more stop surfaces provided on the movable hinge component. The ears may engage the stop surfaces to limit a range of motion of the closure member. These and other features of this disclosure are described in greater detail below.

Figure 1:
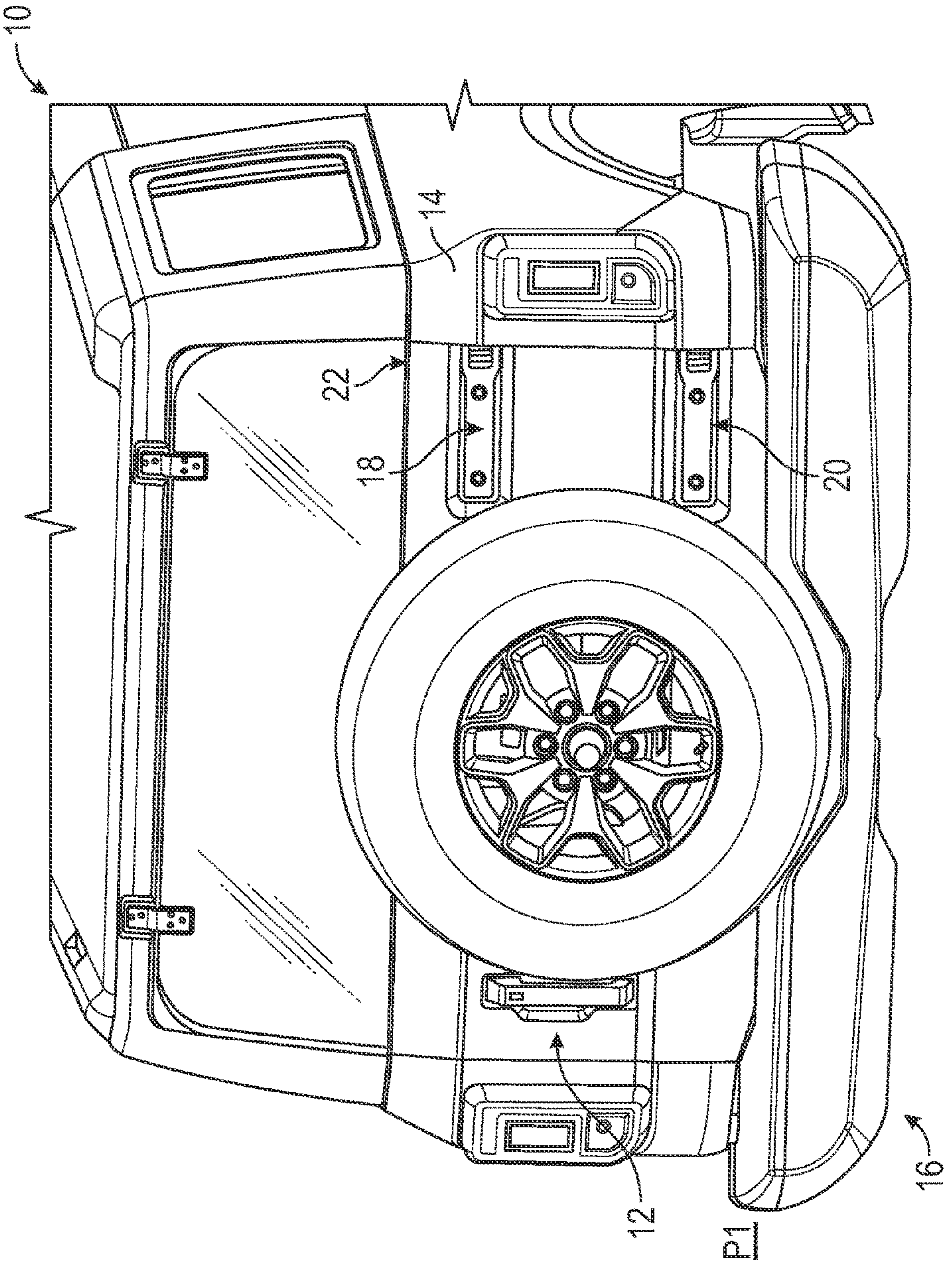
FIG. 1 illustrates a motor vehicle equipped with a closure member system. The closure member system is shown in a closed position in FIG. 1.
Figure 2:
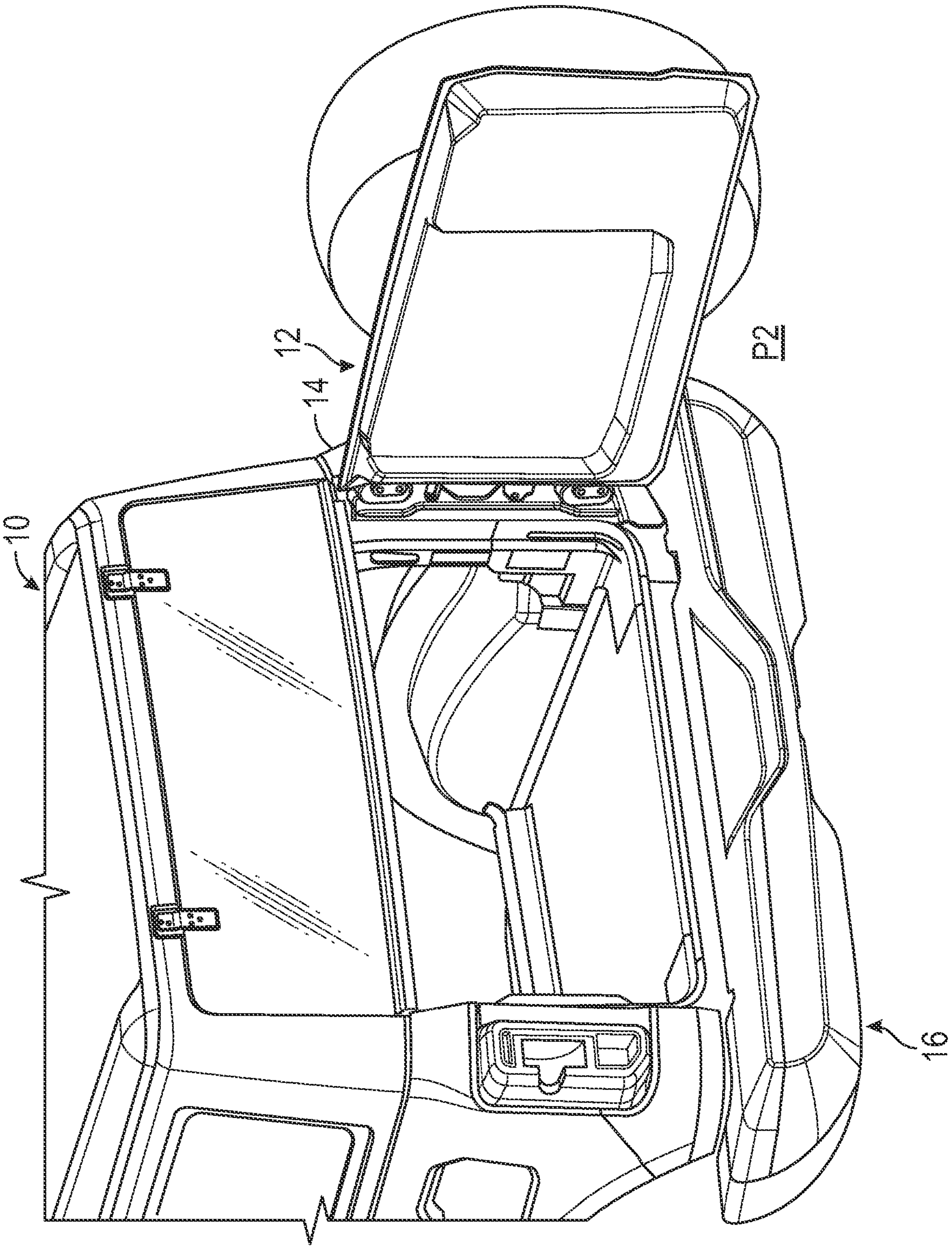
FIG. 2 illustrates a fully open position of the closure member system of FIG. 1.
Figure 3:
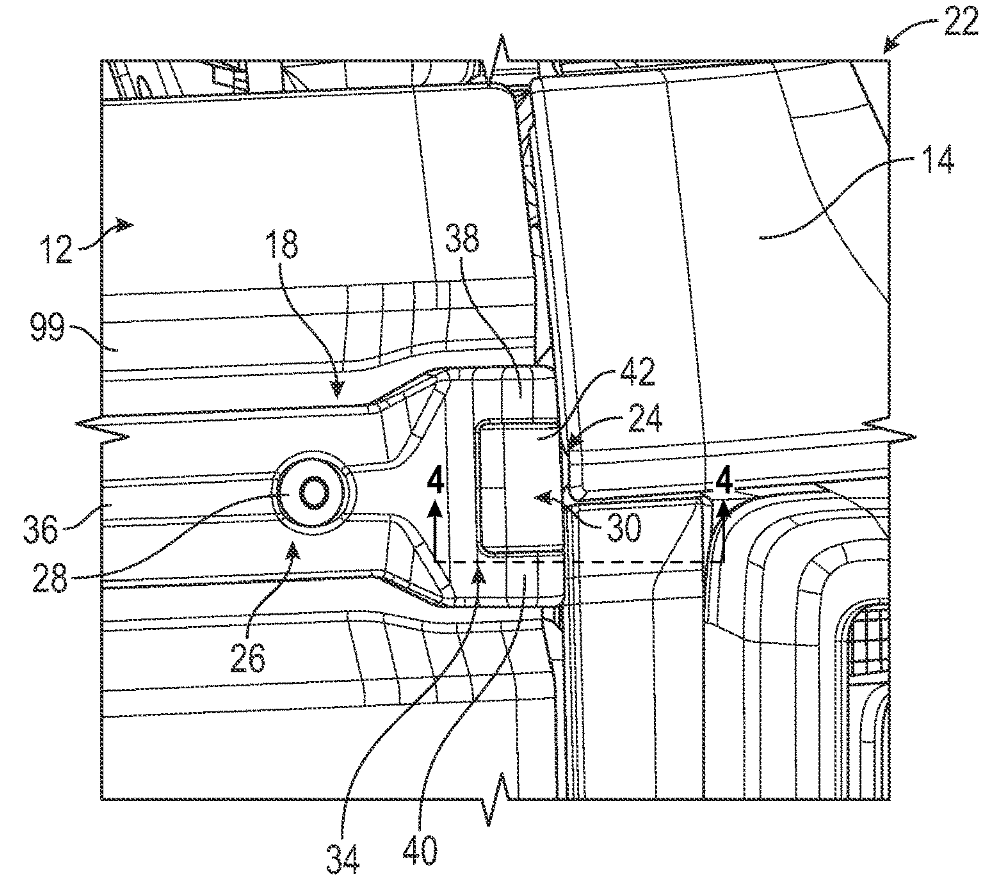
FIG. 3 is a blown up view illustrating select portions of a closure member system.
Figure 4:
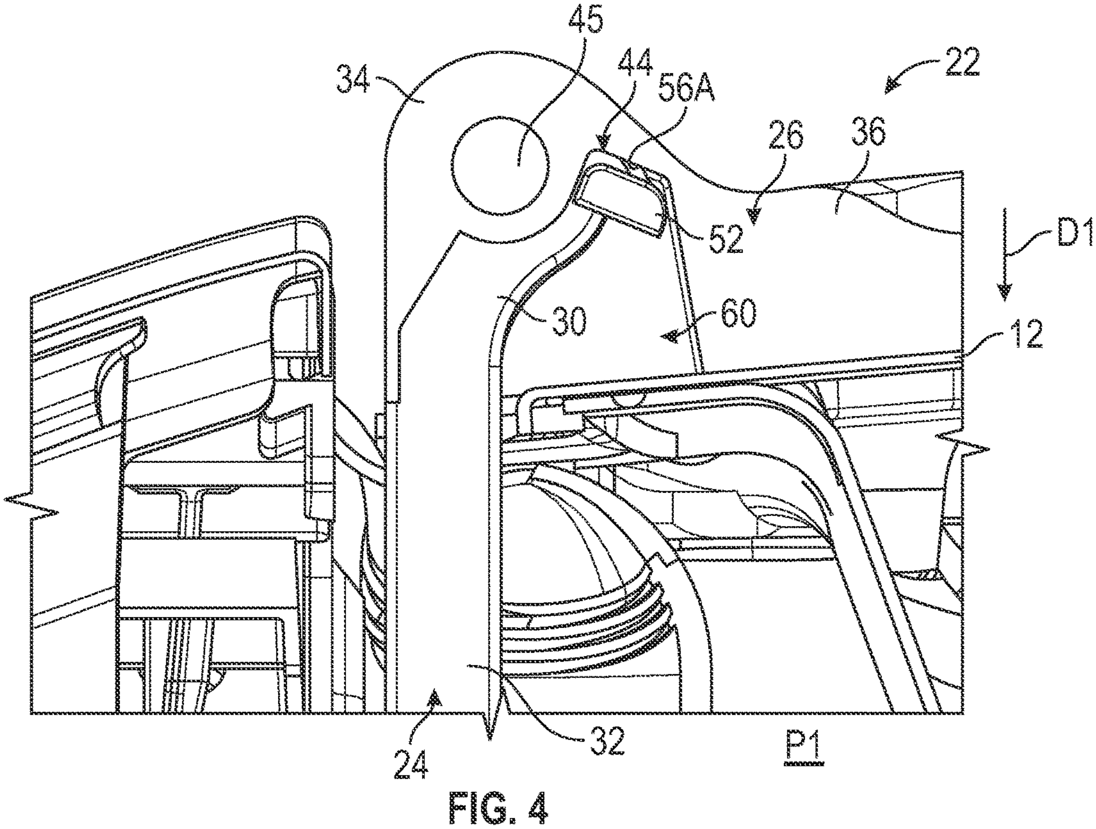
FIG. 4 is a cross-sectional view through section 4-4 of FIG. 3.
Figure 5:
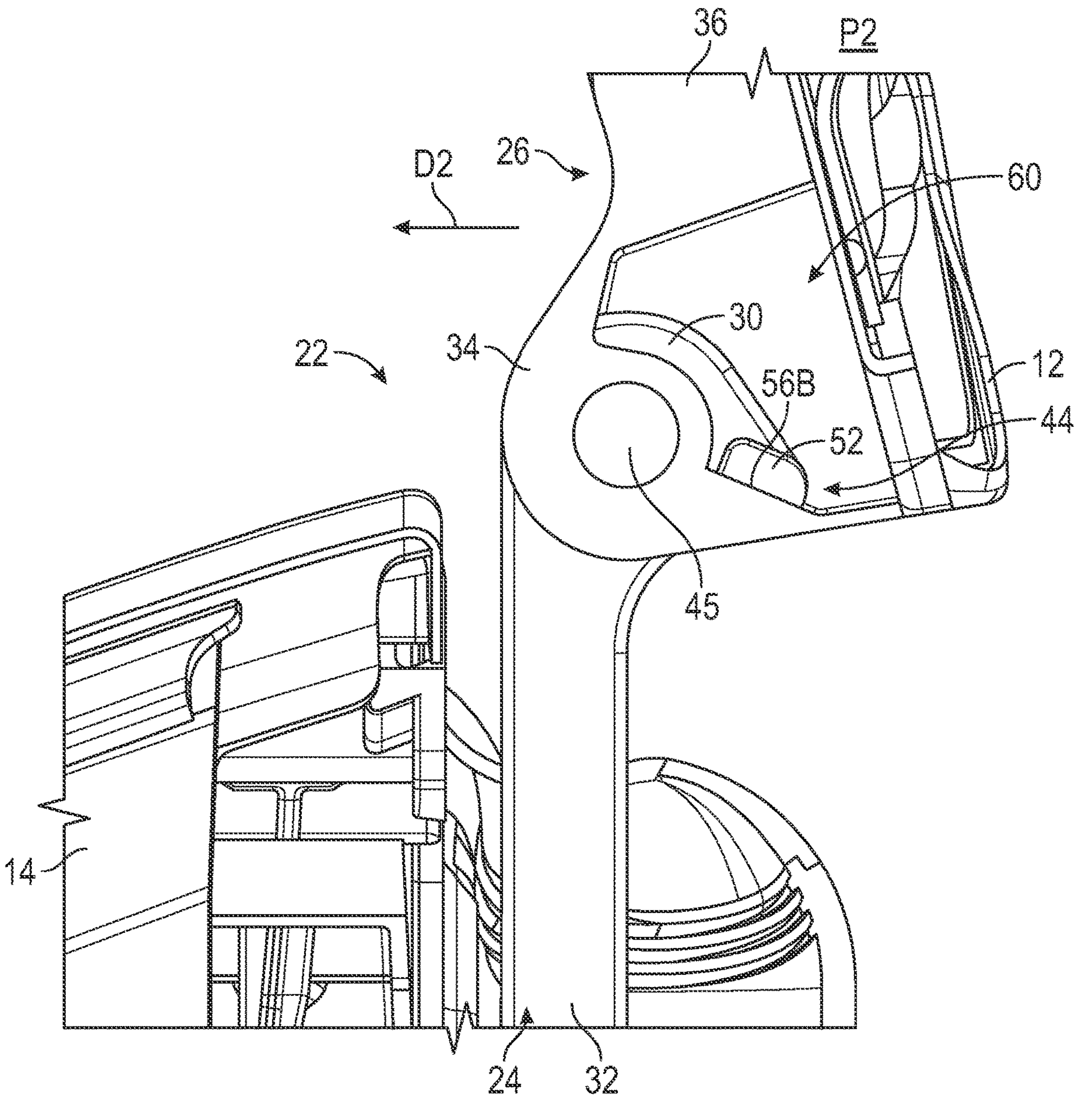
FIG. 5 is a cross-sectional view illustrating a closure member system in a fully open position.
Figure 6:
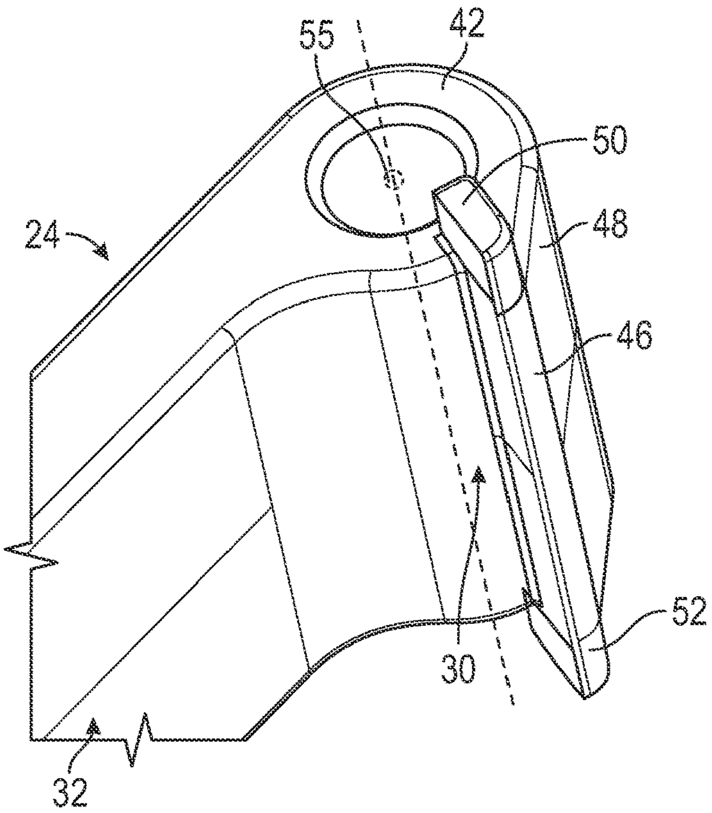
FIG. 6 illustrates select portions of a stationary hinge component of a hinge assembly of a closure member system.
Figure 7:
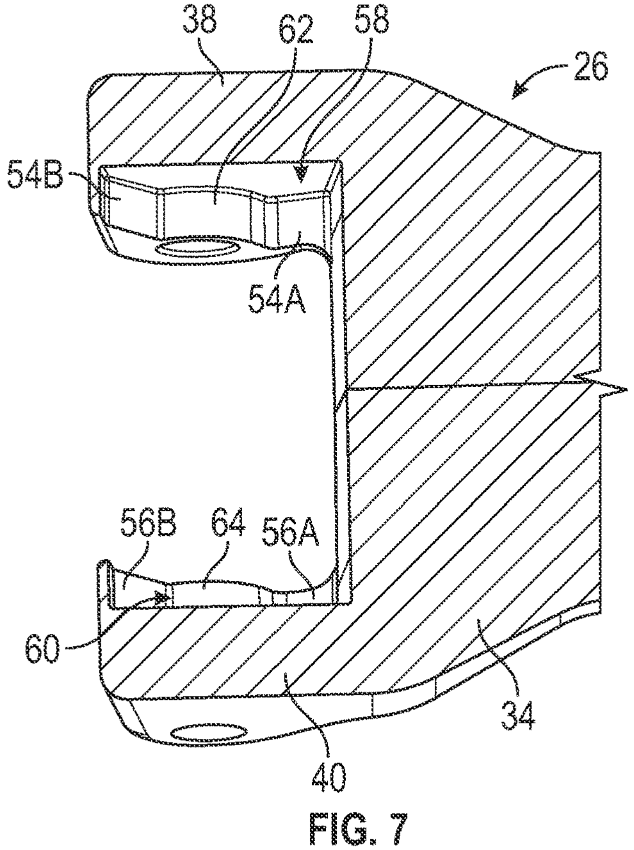
FIG. 7 illustrates select portions of a movable hinge component of a hinge assembly of a closure member system.

FIGS. 1 and 2 schematically illustrate select portions of a motor vehicle 10 (hereinafter referred to simply as "vehicle"). The vehicle 10 may be a car, a truck, a van, a sport utility vehicle, a hearse, a semi tractor-trailer, or any other type of vehicle. The vehicle 10 could also be a conventional motor vehicle, a traction battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component, assembly, or system.

The vehicle 10 may include one or more closure members 12 that are mounted relative to a vehicle body 14 and configured to move between closed and open positions for accessing a vehicle interior (e.g., a cargo space, a passenger cabin, etc.). In the illustrated embodiment, the closure member 12 is mounted at a rear 16 of the vehicle 10 and is configured as a swing gate. In other implementations, the closure member 12 could be part of a dual out-swinging door system that may be provided at the rear 16 of the vehicle 10 for gaining access to the vehicle interior, such as for loading and/or unloading cargo, for example. However, the teachings of this disclosure are not limited to swing gates and rear out-swinging type doors and could apply to various other types of closure members, including but not limited to side doors, tailgates, hearse back doors, etc.

The closure member 12 may be movably mounted to the vehicle body 14 by a first hinge assembly 18 and a second hinge assembly 20. The first and second hinge assemblies 18, 20 may movably support the closure member 12 relative to the vehicle body 14. Together, the closure member 12, the first hinge assembly 18, and the second hinge assembly 20 may establish a closure member system 22 of the vehicle 10. Although two hinge assemblies are illustrated in the exemplary embodiment, the closure member system 22 could include a greater or fewer number of hinge assemblies.

The first hinge assembly 18 may be mounted at a location of the closure member 12 that is vertically above the second hinge assembly 20. However, other configurations could be possible within the scope of this disclosure. Vertical and horizontal, for purposes of this disclosure, are with reference to ground in an ordinary orientation of the vehicle 10 during operation.

In an embodiment, the first hinge assembly 18 and the second hinge assembly 20 are visible when the closure member 12 is closed. The first and second hinge assemblies 18, 20 may therefore be considered exposed or "Class A" hinge assemblies.

The design of the second hinge assembly 20 may be substantially identical to that of the first hinge assembly 18. Therefore, for the purposes of this disclosure, details described herein related to the first hinge assembly 18 should be understood to apply equally to the second hinge assembly 20.

The closure member 12 is shown in a closed position P1 in FIG. 1 and in a fully open position P2 in FIG. 2. When moved to the fully open position P2, the closure member 12 permits users to access the vehicle interior. When closed, the closure member 12 provides a barrier between the interior and the exterior of the vehicle 10. Although not specifically shown, the closure member 12 may be moved to various angular positions between the closed position P1 and the fully open position P2.

In an embodiment, the closure member 12 is angularly displaced relative to the vehicle body 14 by about 100° or more when moved to the fully open position P2. In this disclosure, the term "about" means that the expressed quantities or ranges need not be exact but may be approximated and/or larger or smaller, reflecting acceptable tolerances, conversion factors, measurement error, etc. A total range of motion of the closure member 12 may vary and is dependent on various design criteria.

FIGS. 3, 4, 5, 6, and 7 illustrate additional details associated with the closure member system 22 of FIGS. 1 and 2. In the interests of brevity, only the first hinge assembly 18 is shown and described relative to the closure member 12 and the vehicle body 14 in FIGS. 3-7 since the second hinge assembly 20 is understood to include a design that is identical to the first hinge assembly 18.

The first hinge assembly 18 may include a stationary hinge component 24 and a movable hinge component 26. The stationary hinge component 24 may be mounted to the vehicle body 14 by one or more mechanical fasteners (not shown), and the movable hinge component 26 may be mounted to an exterior surface 99 of the closure member 12 by one or more mechanical fasteners 28 (see FIG. 3). The exterior surface 99 may be referred to as the "class A-surface" of the closure member 12.

The stationary hinge component 24 may include a base portion 30 and a bracket portion 32, and the movable hinge component 26 may also include a base portion 34 and a bracket portion 36. The base portions 30, 34 may be configured to interface with one another, the bracket portion 32 of the stationary hinge component 24 may be mounted to the vehicle body 14, and the bracket portion 36 of the movable hinge component 26 may be mounted to the closure member 12 to movably support the closure member 12 relative to the vehicle body 14.

The movable hinge component 26 may be pivotably connected to the stationary hinge component 24 by a pivot pin 45. The pivot pin 45 may extend through openings provided by a first arm 38 of the base portion 34 of the movable hinge component 26, a barrel mount 42 of the base portion 30 of the stationary hinge component 24, and second arm 40 of the base portion 34 of the movable hinge component 26.

The first hinge assembly 18 may additionally include an internal stop 44 that is configured to limit the range of motion of the closure member 12 as it is moved between the closed position P1 and the fully open position P2. The internal stop 44 is therefore responsible for controlling the lower and upper limits of the swing path of the closure member 12. The internal stop 44 is contained inside (e.g., internal of) the first hinge assembly 18 and is therefore concealed and thus not visible from the exterior of the first hinge assembly 18.

The internal stop 44 may be established by features of both the stationary hinge component 24 and the movable hinge component 26. For example, the base portion 30 of the stationary hinge component 24 may include a beam 46 that protrudes radially outwardly from an outer circumferential surface 48 of the barrel mount 42 of the base portion 30. A first car 50 may extend outwardly in a first direction from the beam 46, and a second car 52 may extend outwardly in a second, opposite direction from the beam 46. The first direction and the second, opposite direction are both parallel to a pivot axis 55 of the barrel mount 42, in an embodiment.

The first arm 38 of the base portion 34 of the movable hinge component 26 may include a pair of stop surfaces 54A, 54B, and the second arm 40 of the base portion 34 of the movable hinge component 26 may include another pair of stop surfaces 56A, 56B. The stop surfaces 54A, 54B may be provided within a first cavity 58 formed in the first arm 38, and the stop surfaces 56A, 56B may be provide within a second cavity 60 formed in the second arm 40. The stop surfaces 54A, 54B may each extend at an angle relative to a first pivot pin boss 62 of the first arm 38, and the stop surfaces 56A, 56B may each extend at an angle relative to a second pivot pin boss 64 of the second arm 40.

In an assembled condition of the first hinge assembly 18, the barrel mount 42 may be accommodated within the open space between the first arm 38 and the second arm 40. The barrel mount 42 may therefore be flanked by the first arm 38 and the second arm 40. As the movable hinge component 26 is rotated about the pivot axis 55, the first car 50 may be accommodated within the space afforded by the first cavity 58 and the second car 52 may be accommodated within the space afforded by the second cavity 60. The first car 50 may engage the stop surface 54A and the second car 52 may engage the stop surface 56A to arrest further movement in a first direction D1 beyond the closed position P1 (see FIG. 4). The first car 50 may engage the stop surface 54B and the second car 52 may engage the stop surface 56B to arrest further movement in a second direction D2 beyond the fully open position P2 (see FIG. 5). The first ear 50, the second car 52, and the stop surfaces 54A, 54B, 56A, and 56B may therefore cooperate to provide the internal stop 44.

The vehicle closure member systems described herein provide a simple and robust manner for opening and closing vehicle closure members while providing an internal stop. The proposed systems provide the internal stop feature without adding additional components or increasing the necessary packaging space required by the closure member system. The internal stop is further provided without influencing styling at the expense of the functional requirements of the closure member system.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle closure member system, comprising:

a closure member;

a first hinge assembly mounted to the closure member; and an internal stop concealed inside the first hinge assembly and configured to limit a range of motion of the closure member between a closed position and a fully open position, wherein the internal stop is established by a first stop surface of a movable hinge component of the first hinge assembly and a first ear of a stationary hinge component of the first hinge assembly, wherein the ear extends from a beam that protrudes radially outwardly from an outer circumferential surface of a barrel mount of the stationary hinge component, and wherein the first stop surface is provided within a first cavity of the movable hinge component.

2. The vehicle closure member system as recited in claim 1, wherein the closure member is a rear swing gate.

3. The vehicle closure member system as recited in claim 1, wherein the first hinge assembly includes the stationary hinge component, the movable hinge component, and a pivot pin that pivotably connects the movable hinge component to the stationary hinge component.

4. The vehicle closure member system as recited in claim 3, wherein the stationary hinge component includes a base portion and a bracket portion, and the movable hinge component includes a base portion and a bracket portion.

5. The vehicle closure member system as recited in claim 4, wherein the base portion of the stationary hinge component includes the barrel mount and the beam that protrudes radially outwardly from the outer circumferential surface of the barrel mount.

6. The vehicle closure member system as recited in claim 5, wherein the base portion of the movable hinge component includes a first arm and a second arm that flank the barrel mount of the stationary hinge component.

7. The vehicle closure member system as recited in claim 6, wherein the beam includes the first ear and a second ear, the first arm includes the first stop surface and a second stop surface, and the second arm includes a third stop surface and a fourth stop surface.

8. The vehicle closure member system as recited in claim 7, wherein the first ear engages the first stop surface and the second ear engages the third stop surface when the closure member is moved to the closed position.

9. The vehicle closure member system as recited in claim 7, wherein the first ear engages the second stop surface and the second ear engages the fourth stop surface when the closure member is moved to the fully open position.

10. The vehicle closure member system as recited in claim 7, wherein the first stop surface and the second stop surface are provided within the first cavity formed in the first arm, and the third stop surface and the fourth stop surface are provided within a second cavity formed in the second arm.

11. The vehicle closure member system as recited in claim 1, comprising a second hinge assembly mounted to the closure member, and further comprising a second internal stop concealed inside the second hinge assembly and configured to limit the range of motion of the closure member between the closed position and the fully open position.

12. The vehicle closure member system as recited in claim 1, wherein the first cavity is formed in a first arm of a base portion of the movable hinge component, and the first ear is received within the first cavity.

13. The vehicle closure member system as recited in claim 12, wherein the first stop surface extends at an angle relative to a first pivot pin boss of the first arm.

14. The vehicle closure member system as recited in claim 12, wherein the first cavity at least partially surrounds a first pivot pin boss of the first arm.

15. A vehicle, comprising:

a vehicle body;

a closure member; and a first hinge assembly configured to movably support the closure member relative to the vehicle body, wherein the first hinge assembly includes an internal stop established by an ear of a stationary hinge component of the first hinge assembly and a stop surface of a movable hinge component of the first hinge assembly, wherein the ear extends from a beam that protrudes radially outwardly from an outer circumferential surface of a barrel mount of the stationary hinge component, and the stop surface is provided within a cavity formed in an arm of the movable hinge component.

16. The vehicle as recited in claim 15, wherein the closure member is a rear swing gate.

17. The vehicle as recited in claim 15, wherein the internal stop is concealed within the first hinge assembly.

18. The vehicle as recited in claim 17, wherein the internal stop is not visible from an exterior of the first hinge assembly.

19. The vehicle as recited in claim 15, wherein the stationary hinge component is mounted to the vehicle body and the movable hinge component is mounted to the closure member.

20. A vehicle closure member system, comprising:

a closure member;

a first hinge assembly mounted to the closure member and including includes a stationary hinge component, a movable hinge component, and a pivot pin that pivotably connects the movable hinge component to the stationary hinge component; and an internal stop concealed inside the first hinge assembly and configured to limit a range of motion of the closure member between a closed position and a fully open position, wherein the stationary hinge component includes a base portion and a bracket portion, and the movable hinge component includes a base portion and a bracket portion, wherein the base portion of the stationary hinge component includes a barrel mount and a beam that protrudes radially outwardly from an outer circumferential surface of the barrel mount, wherein the base portion of the movable hinge component includes a first arm and a second arm that flank the barrel mount of the stationary hinge component, wherein the beam includes a first ear and a second ear, the first arm includes a first stop surface and a second stop surface, and the second arm includes a third stop surface and a fourth stop surface, wherein the first stop surface and the second stop surface are provided within a first cavity formed in the first arm, and the third stop surface and the fourth stop surface are provided within a second cavity formed in the second arm.

* * * * *